Sept. 8, 1931.     E. G. BELL     1,822,722
BRAKE CYLINDER PROTECTOR
Filed Feb. 17, 1930     2 Sheets-Sheet 1
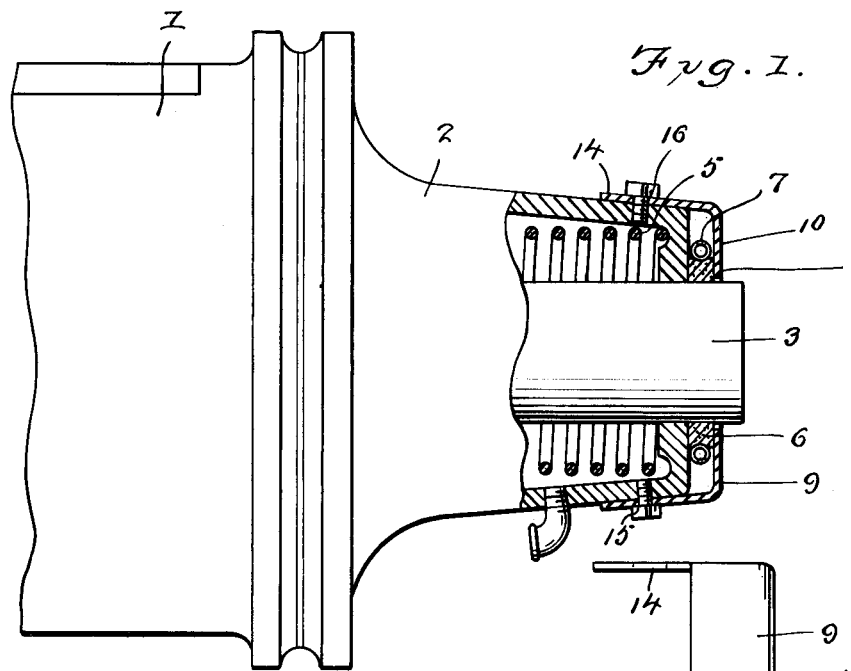
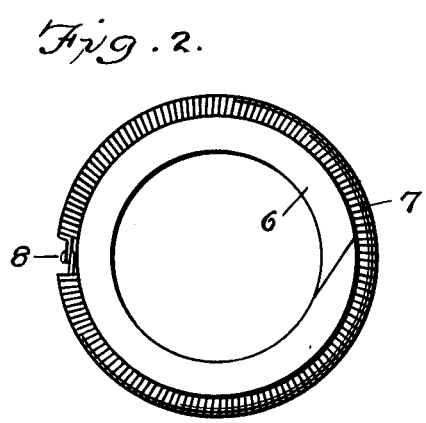
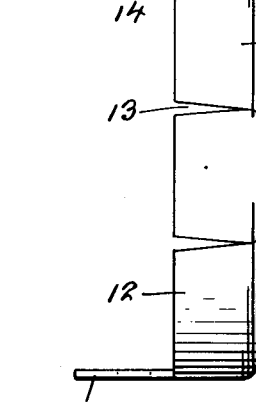
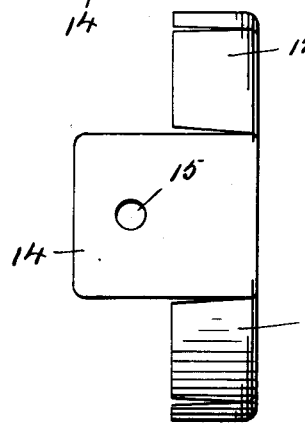
E. G. Bell INVENTOR
BY Victor J. Evans
ATTORNEY Sept. 8, 1931.  E. G. BELL  1,822,722
BRAKE CYLINDER PROTECTOR
Filed Feb. 17, 1930  2 Sheets-Sheet 2
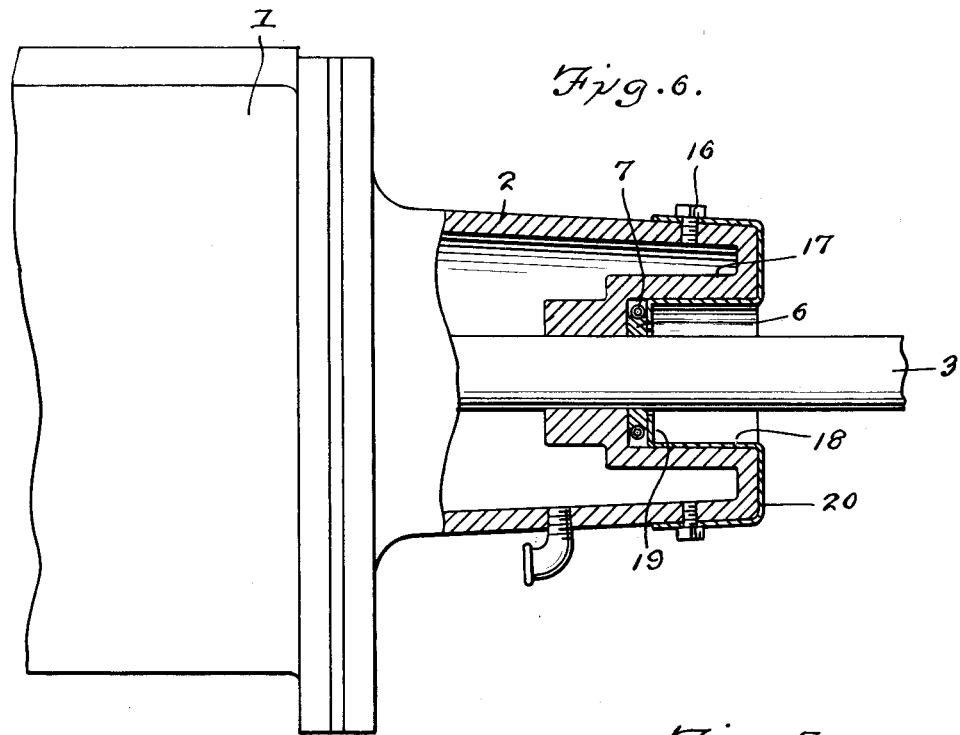
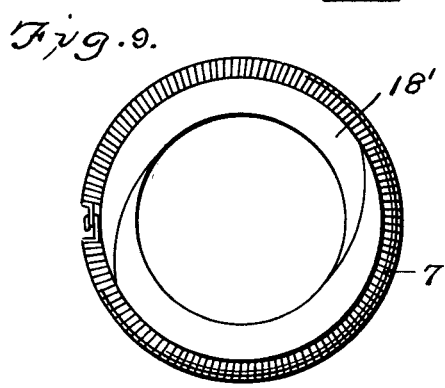
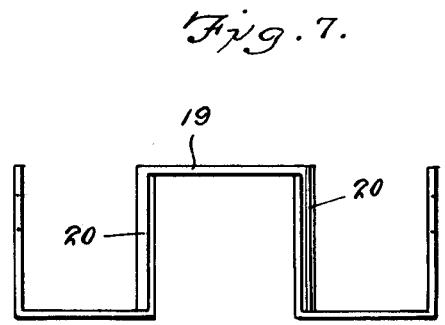
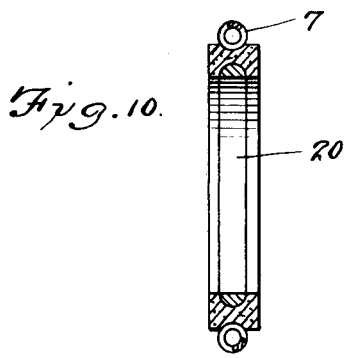
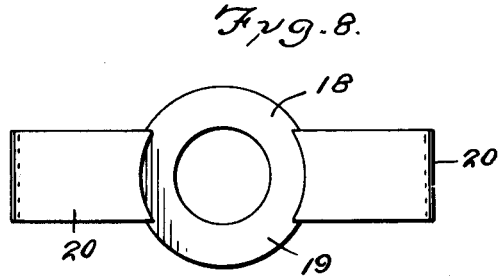
E. G. Bell
INVENTOR
BY Victor J. Evans
ATTORNEY Patented Sept. 8, 1931

1,822,722

UNITED STATES PATENT OFFICE

EUGENE G. BELL, OF NORFOLK, VIRGINIA

BRAKE CYLINDER PROTECTOR

Application filed February 17, 1930. Serial No. 429,150.

This invention relates to new and useful improvements in a brake cylinder protector and has for its primary object the provision of means for establishing the desired leak-proof connection between a brake cylinder and its piston rod and which will prevent moisture, dirt and other foreign matter from entering the brake cylinder and thereby obviate dilution of the lubricant in the cylinder and also prevent pitting of the walls of the cylinder by dirt and other foreign matter, consequently prolonging the life of the cylinder and the other parts therein.

Another object of this invention is the provision of tension means for yieldably supporting the packing in constant engagement with the piston or brake rod to establish the leak-proof connection desired and which will permit the packing to move laterally of the cylinder to compensate for the vibration of said piston or brake rod without effecting the leak-proof connection.

A further object of this invention is the provision of a brake cylinder protector of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation partly in section illustrating a brake cylinder protector constructed in accordance with my invention and applied to a brake cylinder.

Figure 2 is a front elevation illustrating the packing and its yieldable support.

Figure 3 is a sectional view illustrating the same.

Figure 4 is a side elevation illustrating a protector cap.

Figure 5 is a plan view illustrating the same.

Figure 6 is a side elevation partly in section illustrating a modified form of my invention.

Figure 7 is a plan view illustrating the same.

Figure 8 is a front elevation illustrating the modified form of protector cap.

Figure 9 is a plan view illustrating a modified form of packing, and

Figure 10 is a sectional view illustrating the same.

Referring in detail to the drawings the numeral 1 indicates a brake cylinder of the air-type and of the usual construction having the reduced extension or neck 2 to slidably receive the piston or brake rod 3. The piston located in the cylinder 1 and not shown is urged in one direction by the spring 5 and which is common in air brake cylinders. In order to prevent the escape of air between the neck 2 and the rod 3 a packing is usually provided and during use it has frequently been found to admit dirt, moisture and other foreign matter to the interior of the cylinder and to obviate this objection I have provided my invention.

A packing ring 6 constructed from a fibrous material or any other material suitable for the purpose is mounted on the rod 3 and bears against the partly closed end of the neck 2 of the cylinder 1 and in tight engagement with said rod 3 as clearly shown in Figure 1 of the drawings. The packing ring 6 is of the split type and has its ends beveled or cut on an inclined plane as clearly shown in Figure 2 so that the packing ring may expand with the expansion and contraction of the rod. A yieldable spring 7 surrounds the periphery of the packing ring 6 as clearly shown in Figures 1 and 2 of the drawings for the purpose of continuously urging the packing ring in tight engagement with the rod 3 consequently establishing a leak-proof connection between the end of the cylinder and the rod 3 to prevent the escape of air from the cylinder and to prevent the entrance of dirt, moisture and other foreign matter to the cylinder. The yieldable spring 7 is of the coil type which has one end bent to form a loop or eye to receive a hook 8 formed on the other end whereby the spring 7 may be easily and conveniently fastened about the packing ring and removed therefrom when desired.

To retain the packing ring 6 in engagement with the end of the extension 2, a cap 9 is provided and consists of a disk 10 having an opening 11 to receive the rod 3 and the opening is of a diameter greater than the circumference of the rod. The disk 10 has an annular flange 12 formed thereon and adapted to frictionally engage the neck or extension 2 of the cylinder and is provided with a plurality of relatively spaced notches 13 to form the flange 12 into resilient gripping portions that will effectively grip the outer wall of the extension or neck 2. A pair of oppositely disposed attaching ears 14 are formed on the flange 12 and are provided with openings 15 to receive set bolts 16 threaded in suitable openings in the neck or extension 2 that further secure the cap 9 in place on the cylinder and the rod 3. The disk 10 of the cap 9 is of a greater diameter than the diameter of the packing ring 6 to form a space between the rod 3 and the flange 12 that will permit the packing ring to yield with the rod 3 when the latter is moved by vibration or the like.

Referring to my modified form of invention as shown in Figures 6 to 10 inclusive the neck or extension 2 of the cylinder 1 is provided at the free end with an inwardly extending socketed member 17 that slidably supports the rod 3. The bore of the socketed member 17 is of a diameter at one part thereof greater than the circumference of the rod 3 and has positioned therein the packing ring 6 and the spring 7. The modified form of cap or closure member 18 comprises the disk 19 having the centrally arranged opening to receive the rod 3 and is positioned against the outer face of the packing ring 6 and has formed on its periphery attaching arms 20 which are substantially U-shape and are positioned over the end of the neck or extension 2 as clearly shown in Figure 6. The substantially U-shape arms 20 have one of their arm portions disposed within the bore of the socketed member 17 while the other arm portions are apertured and disposed over the extension of the neck 2 and receive the set bolts 16 thereby retaining the packing ring 6 in engagement with the inner wall of the bore of the extension 17.

In Figures 9 and 10 of the official drawings I have shown a modified form of packing ring including a pair of sections 18 having their ends cut on angles and arranged in overlapping relation as clearly shown in Figure 9 and the inner periphery of the ring 18 is provided with an annular groove in which is positioned a lubricant filler 20 constructed from any material suitable for the purpose and preferably containing graphite to lubricate the rod 3 between itself and the packing ring.

From the foregoing description taken in connection with the accompanying drawings, it will be noted that I have provided a novel form of protector which may be easily and conveniently applied to an air-brake cylinder and its brake rod without altering the construction of either and which will exclude moisture, dirt and other foreign matter from the interior of the cylinder and which will permit quick and free operation of the brake rod 3 at all times which is very essential in some instances when desiring to rapidly apply the brakes connected to the rod 3.

The caps 9 and 18 are constructed from rather thin material, capable of flexing when undue pressure is placed thereon from an outwardly direction of the cylinder during the quick application of the brakes to permit the air to escape by unseating from the packing.

While I have shown and described the preferred embodiment of my invention, it will be understood that minor changes in construction, combination and arrangement of parts may be made without departing from the spirit and scope of the invention as claimed.

Having thus described my invention, what I claim is:

A protector including a cylinder neck having an inwardly extending socketed member to slidably support a piston rod and having a portion of the bore of a larger diameter than the diameter of said rod, a split packing in the bore, tension means forcing the packing against the rod, a disk engaging one face of the packing and holding the opposite face thereof against the neck, substantially U-shaped members formed on the disk with certain arm portions thereof engaging the wall of the bore of the socket member and the other arm portions engaging the outer face of the neck, and fasteners securing the last named arm portions to the neck.

In testimony whereof I affix my signature.

EUGENE G. BELL.